July 23, 1963 F. Z. FOUSE ETAL 3,098,565
AUTOMATIC CONTAINER INSPECTION MACHINE
Filed Sept. 8, 1960 12 Sheets-Sheet 3

INVENTORS
FREDERICK Z. FOUSE
JAY F. KIDWELL
BY
ATTORNEY

July 23, 1963 F. Z. FOUSE ETAL 3,098,565
AUTOMATIC CONTAINER INSPECTION MACHINE
Filed Sept. 8, 1960 12 Sheets-Sheet 4
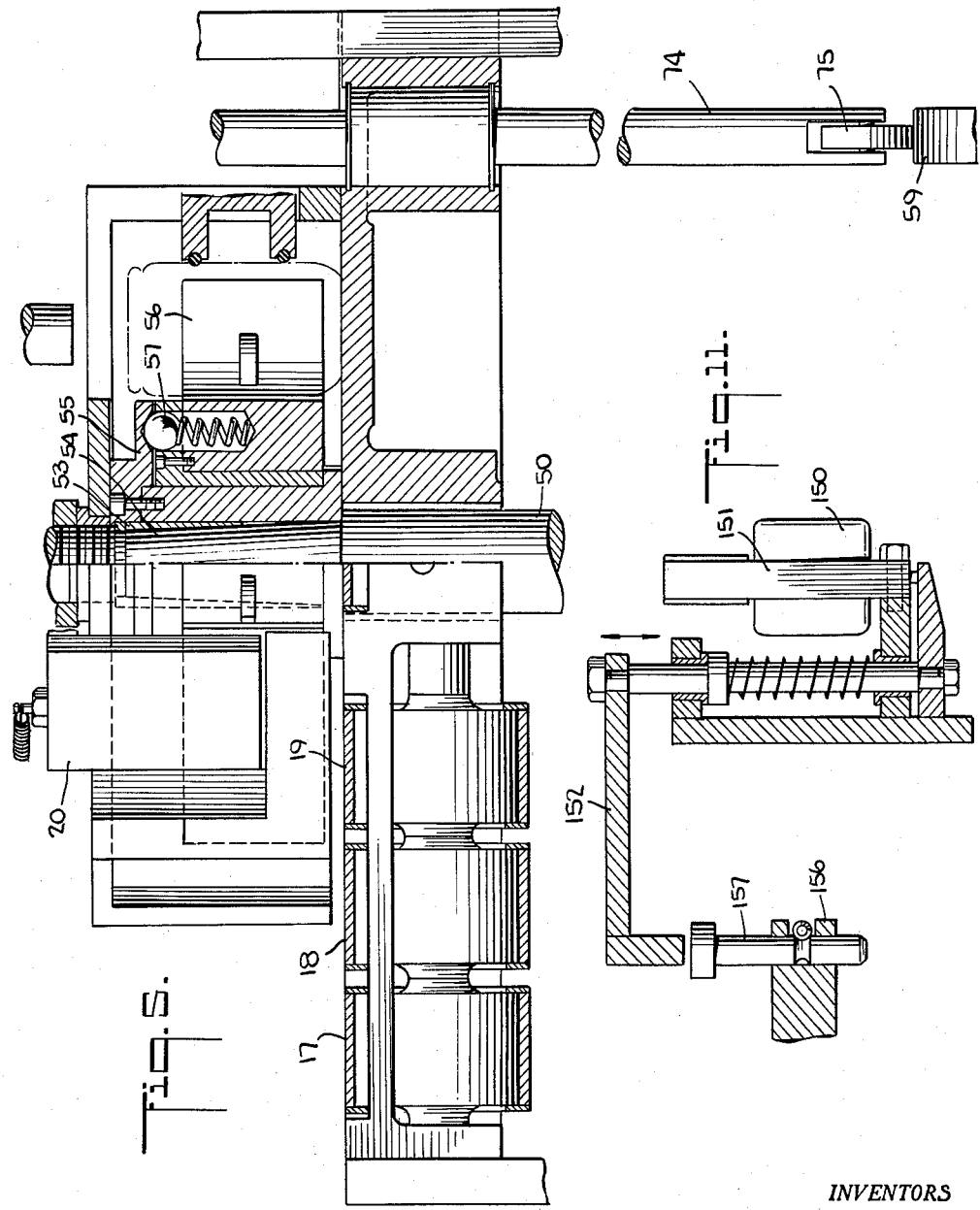
INVENTORS
FREDERICK Z. FOUSE
JAY F. KIDWELL
BY
ATTORNEY

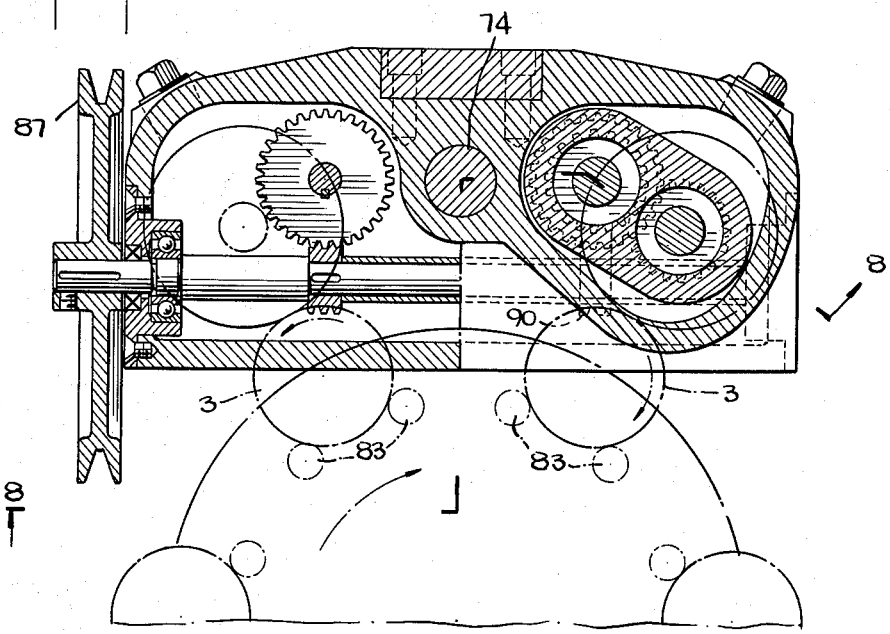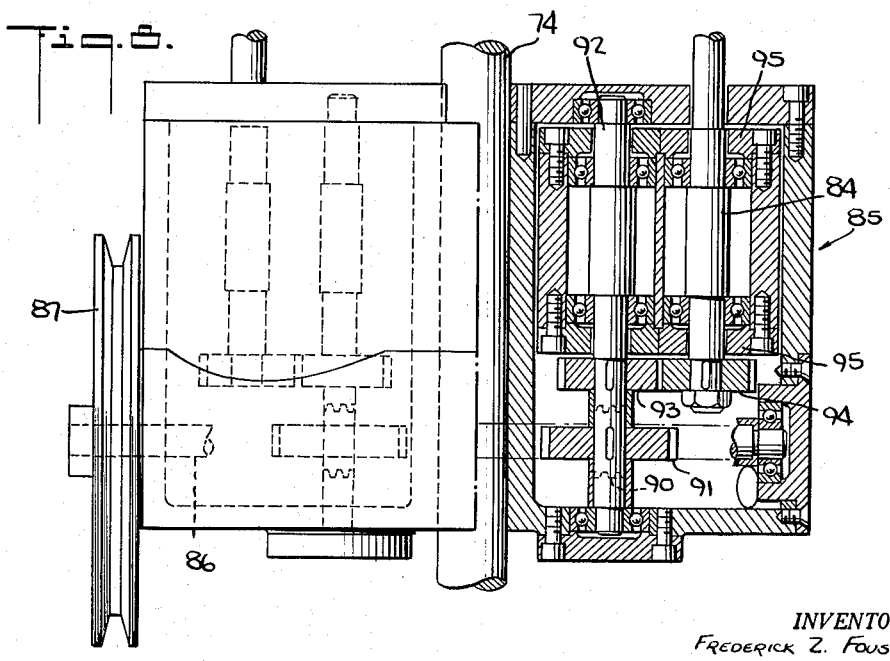

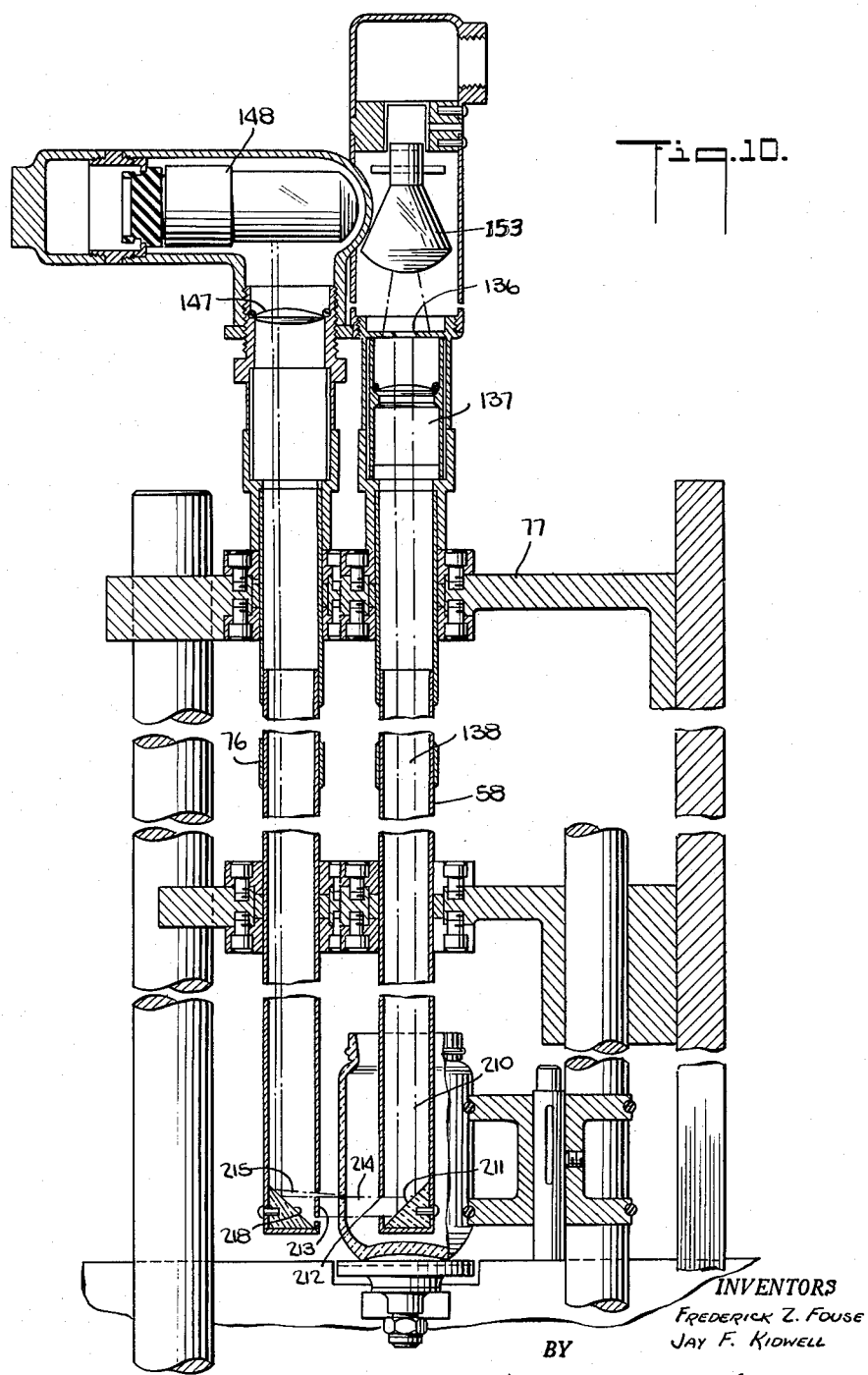

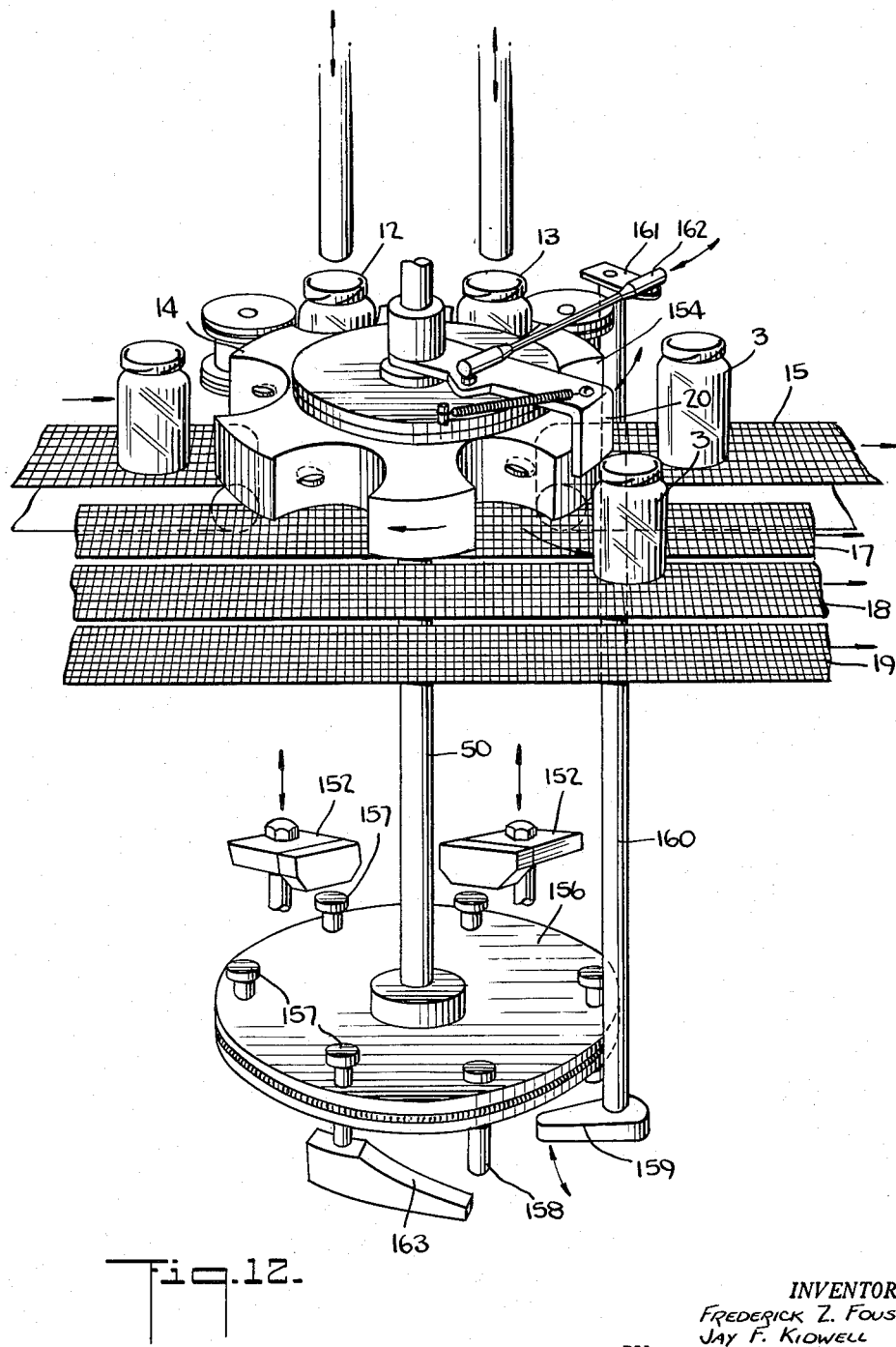

July 23, 1963 F. Z. FOUSE ETAL 3,098,565
AUTOMATIC CONTAINER INSPECTION MACHINE
Filed Sept. 8, 1960 12 Sheets-Sheet 8
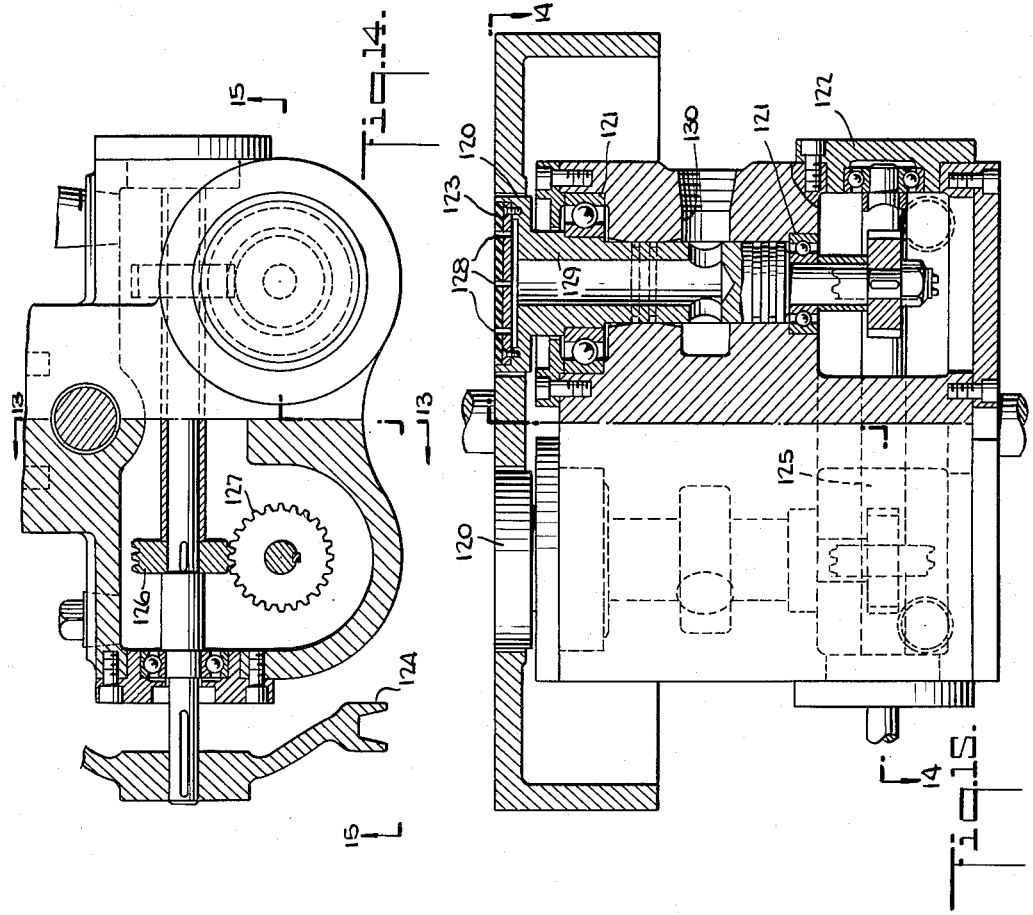
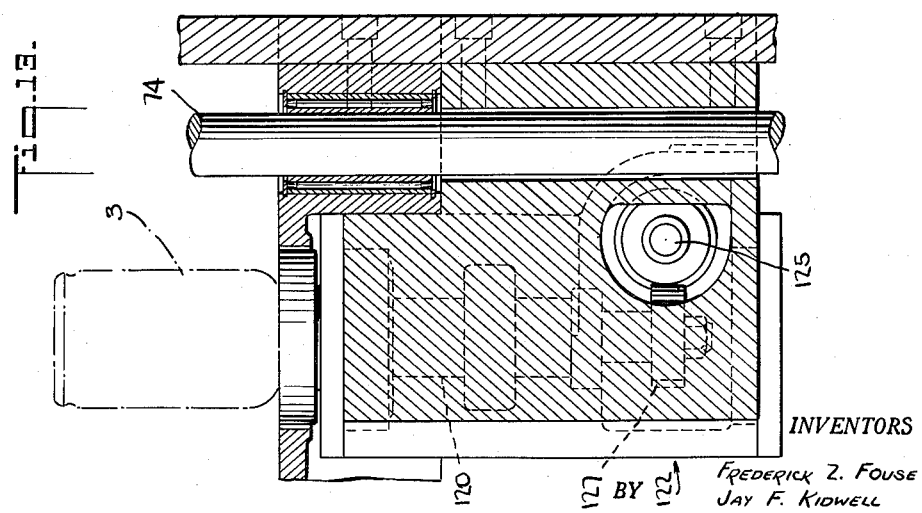
INVENTORS
FREDERICK Z. FOUSE
JAY F. KIDWELL
BY
ATTORNEY

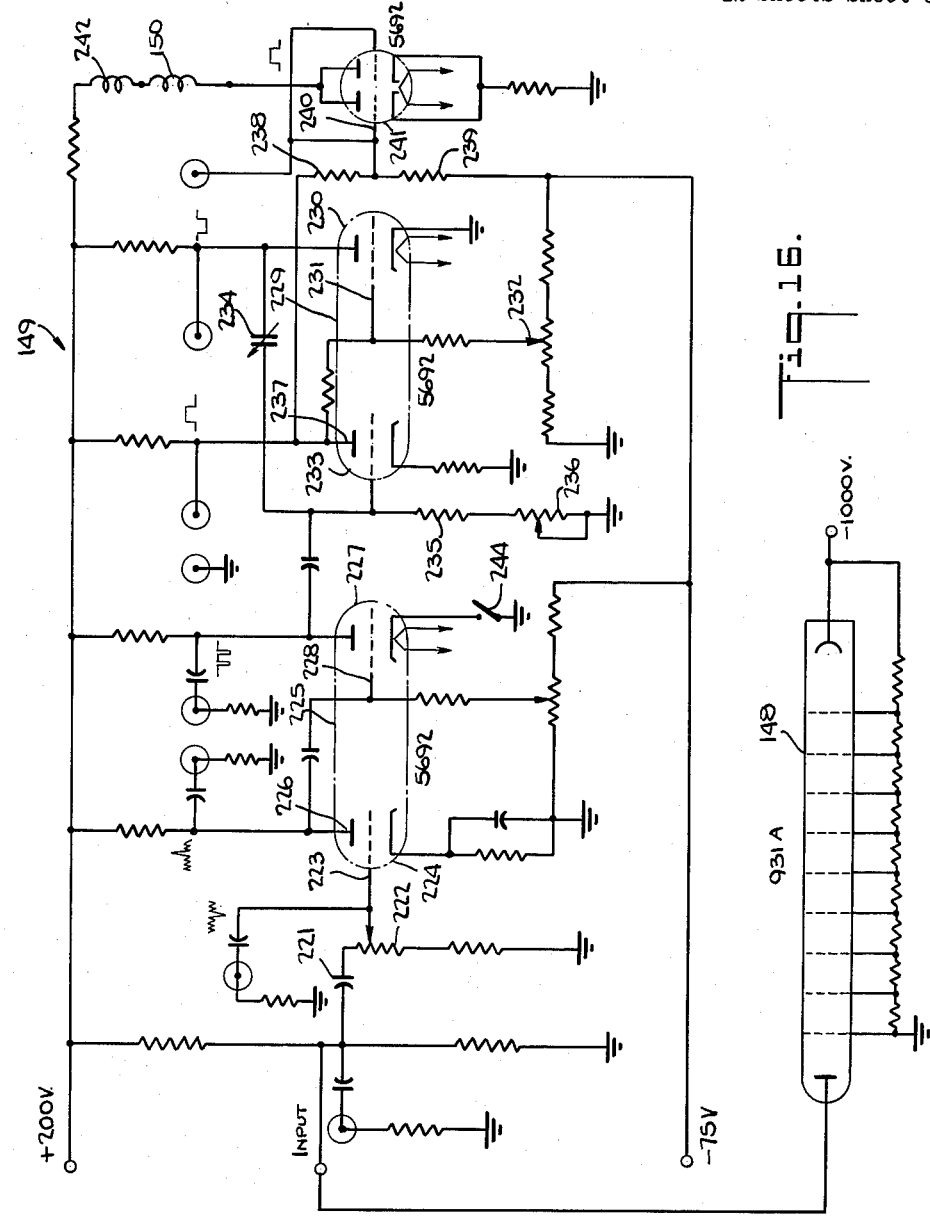

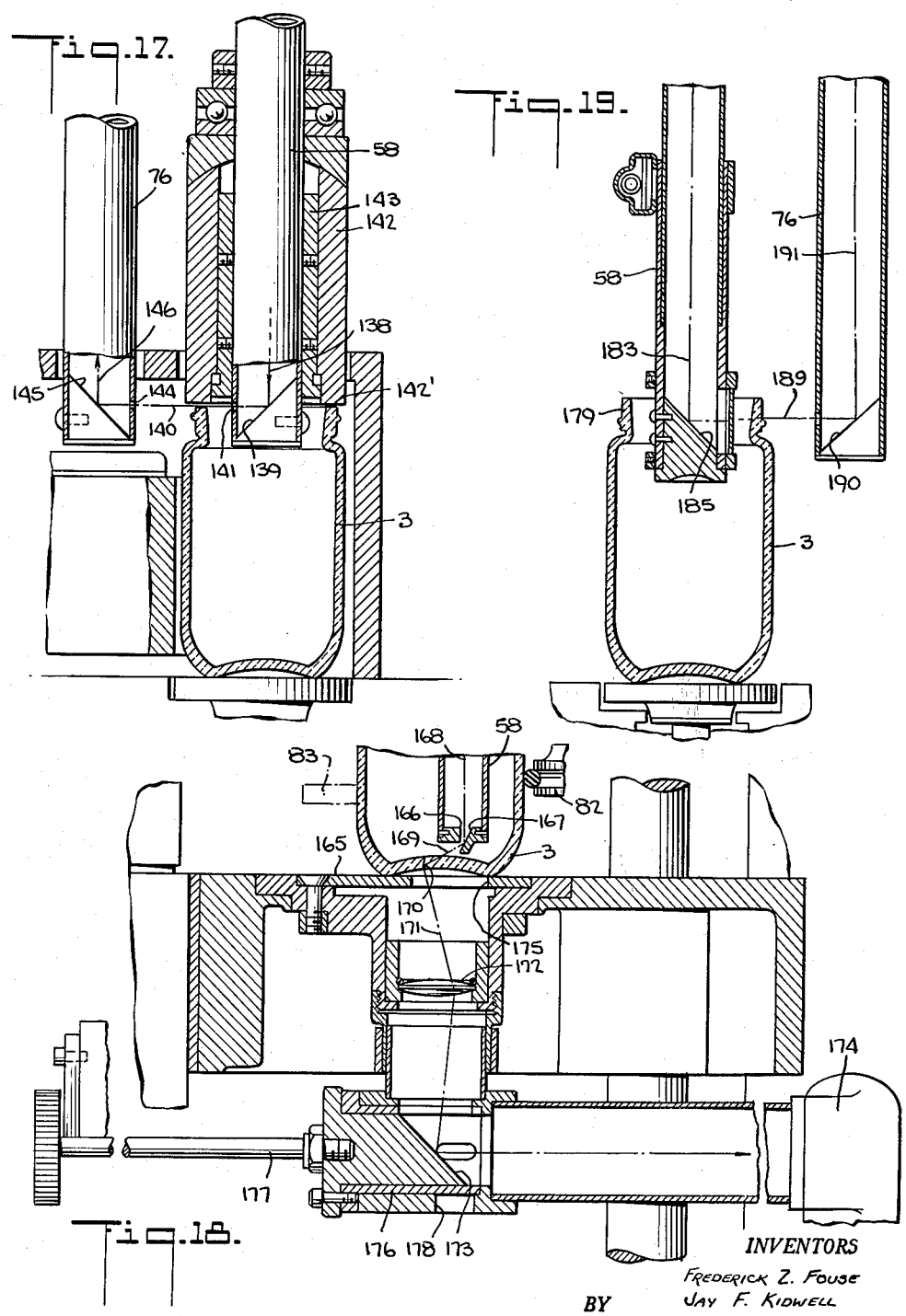

July 23, 1963 F. Z. FOUSE ETAL 3,098,565
AUTOMATIC CONTAINER INSPECTION MACHINE
Filed Sept. 8, 1960 12 Sheets-Sheet 11
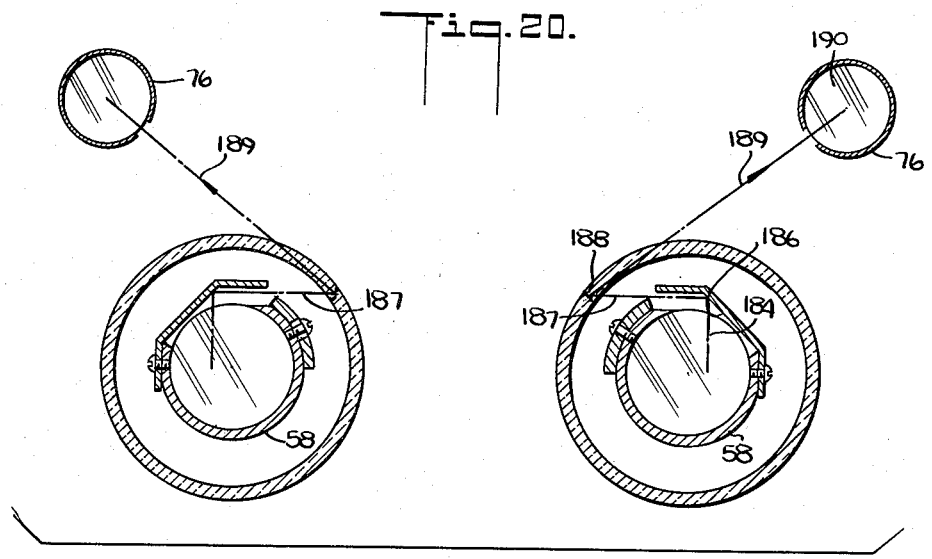
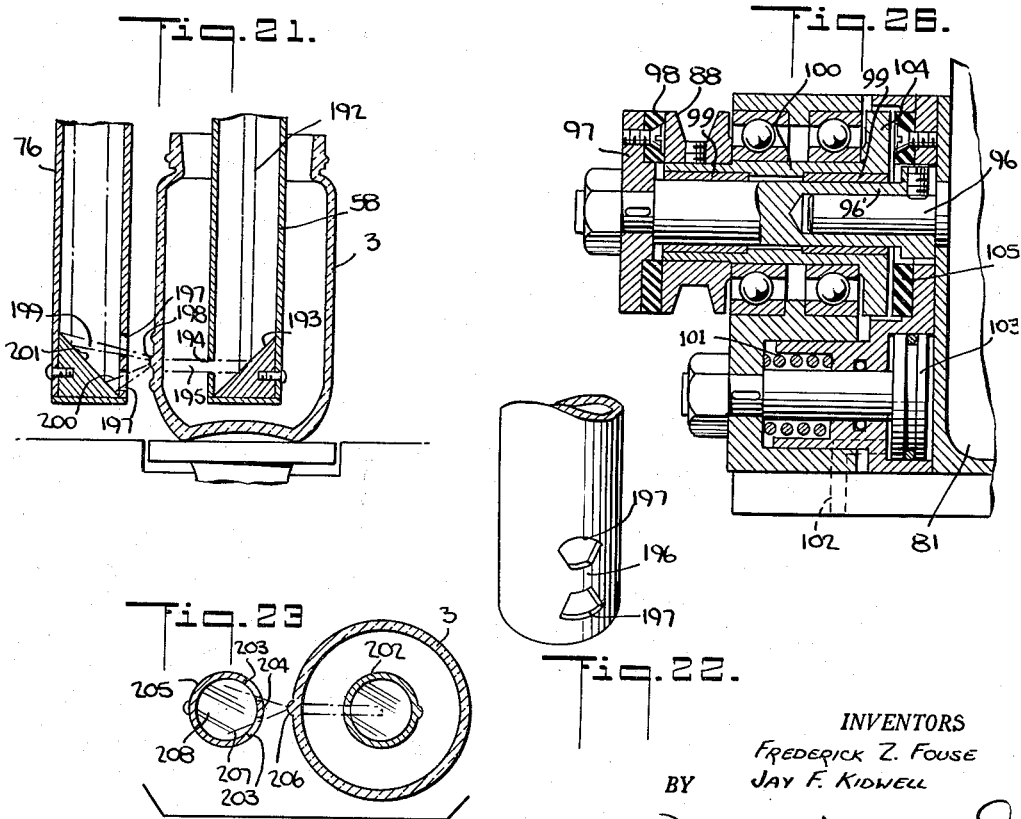
INVENTORS
FREDERICK Z. FOUSE
JAY F. KIDWELL
BY
ATTORNEY

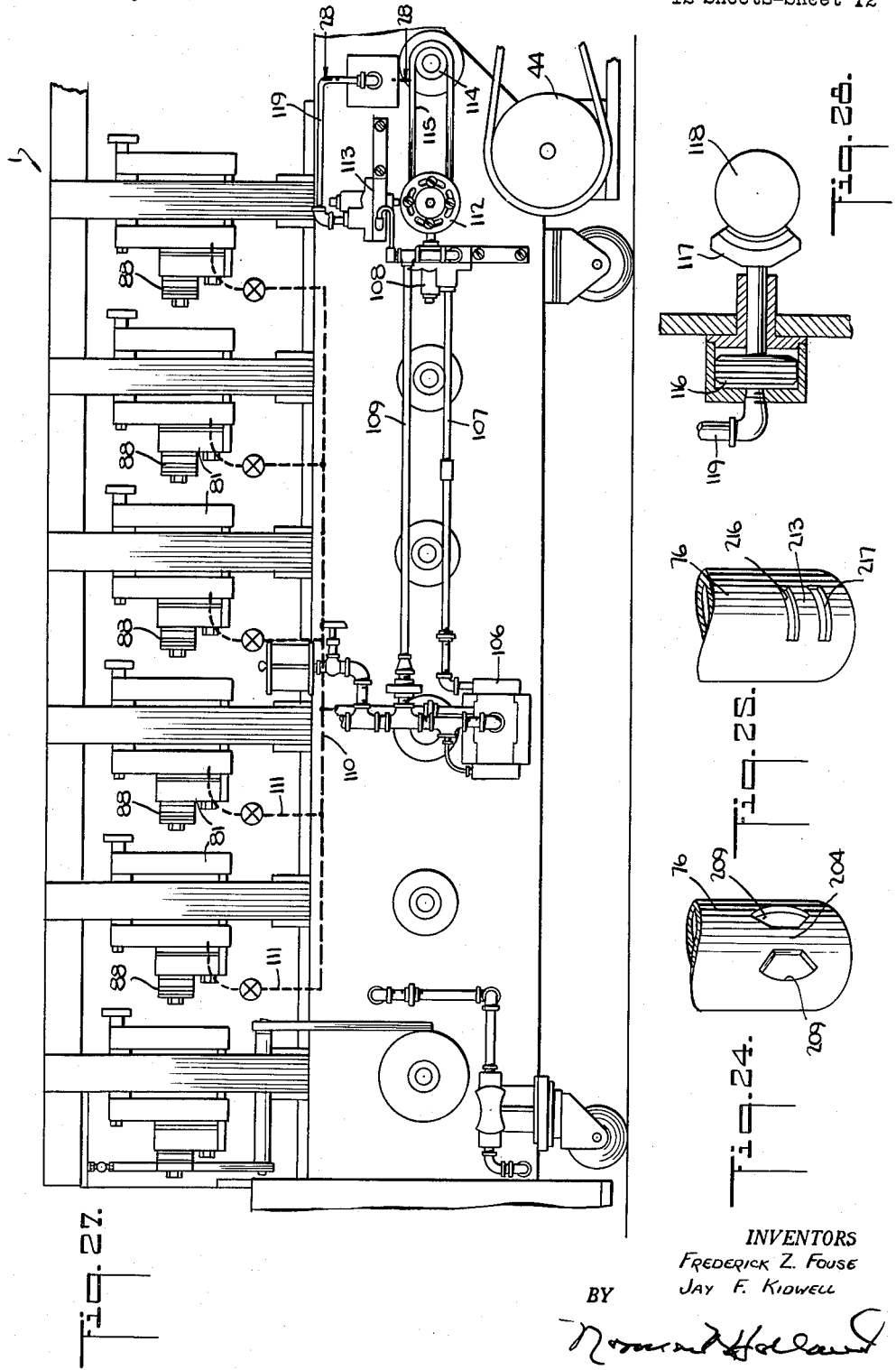

3,098,565
AUTOMATIC CONTAINER INSPECTION MACHINE
Frederick Z. Fouse and Jay F. Kidwell, Lancaster, Ohio, assignors to Anchor Hocking Glass Corporation, Lancaster, Ohio, a corporation of Delaware
Filed Sept. 8, 1960, Ser. No. 54,616
19 Claims. (Cl. 209—111.5)

The present invention relates to an automatic inspection machine for detecting defects in transparent containers and for automatically removing such defective containers from a supply of containers.

When glass containers having flaws are inadvertently fed to filling and sealing machines there is a danger of product contamination where the defective containers are not detected prior to distribution and a waste of the sealed product where the sealed containers are rejected due to container flaws. There also is a possibility that the defective containers may be broken as they pass through the filling and sealing machines causing the entire sealing line to be shut down with a consequent loss of time and inconvenience which may add appreciably to the packaging expenses.

Breakage of defective containers is more likely to occur in the newer higher speed sealing machines which have now been introduced generally throughout the packaging field. Glass containers passing through such high speed machines are necessarily subjected to greater forces due to the increased speed with which the jars are handled and it is, therefore, extremely important to feed only perfect containers through such machines. In order to fully realize the inherent economies gained from the use of high speed sealing machines it is necessary to provide a related container inspection which is fully automatic and reliable so that the inspection can proceed at the same rate as the packaging with a minimum of container handling.

It is also desirable to have an inspection machine which is relatively compact and adaptable for operation directly in a sealing line if necessary so that the inspection may be carried out immediately prior to the container filling operation. This eliminates additional handling and a possible subsequent damage of the containers between the inspection and the filling and sealing operations.

Present inspection machines do not meet these requirements since they either operate at relatively low speeds or are relatively large and complex. They are also limited in the variety of container flaws which they will detect. Present sealing machine are also vulnerable to stoppage by the breakage of the containers being inspected and passed through the inspection machines themselves.

Accordingly, an object of the present invention is to provide an improved automatic inspection machine for transparent containers.

Another object of the present invention is to provide a compact and high speed automatic container inspection machine adapted to inspect all surfaces of a transparent container.

Another object of the present invention is to provide an automatic container inspection machine adapted to eject containers immediately upon the detection of a flaw.

Another object of the present invention is to provide an improved high speed automatic container inspection machine adapted to discriminate between containers having objectionable and unobjectionable flaws so that the latter containers are not rejected.

Another object of the present invention is to provide a compact, high speed and reliable container inspection machine adapted to be positioned directly in a high speed container sealing line.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 4 is a fragmentary top plan view of the container entry end of the inspection machine;

FIG. 5 is a sectional view of the first inspection station taken along line 5—5 of FIG. 4;

FIG. 7 is a sectional view of the container rotating drive taken along line 7—7 of FIG. 6;

FIG. 8 is a sectional view of the container rotating drive taken along line 8—8 of FIG. 7;

FIG. 9 is an enlarged top plan view of an inspection station photoelectric cell mounting bracket;

FIG. 10 is a sectional view of the optical scanning system for a container body inspection station taken along line 10—10 of FIG. 9;

FIG. 11 is an enlarged sectional detailed view of the container rejection solenoid and a reject pin;

FIG. 12 is a perspective view of the container rejection gate control system;

FIG. 13 is an enlarged detailed sectional view of another embodiment of a container rotating drive taken along line 13—13 of FIG. 14;

FIG. 14 is a sectional view of the container rotating drive of FIG. 13 taken along line 14—14 of FIG. 15;

FIG. 15 is a side elevational view partially in section of the container rotating drive of FIG. 13 taken along line 15—15 of FIG. 14;

FIG. 16 is a schematic diagram of a preferred amplifier for the container rejection systems;

FIG. 17 is a vertical sectional view of the jar rim dip inspection station;

FIG. 18 is a vertical sectional view of the bottom inspection station;

FIG. 19 is a sectional view of the finish inspection station;

FIG. 20 is a horizontal sectional view of the finish inspection station;

FIG. 21 is a vertical sectional view of the body washboard inspection station;

FIG. 22 is a fragmentary detailed perspective view of the bottom of the photocell tube for the washboard inspection station;

FIG. 23 is a horizontal view of the vertical mark inspection station;

FIGS. 24 and 25 are fragmentary detailed perspective views of the bottoms of the photocell tubes for the vertical mark, and the blister and stone inspection stations, respectively;

FIG. 26 is a sectional view of the container drive pulley air brakes;

FIG. 27 is a side elevational view of the air feed system for the air brakes of FIG. 26; and, FIG. 28 is a fragmentary detailed sectional view of the brake for the pocket wheel drive shaft.

General Description

Figure 2:
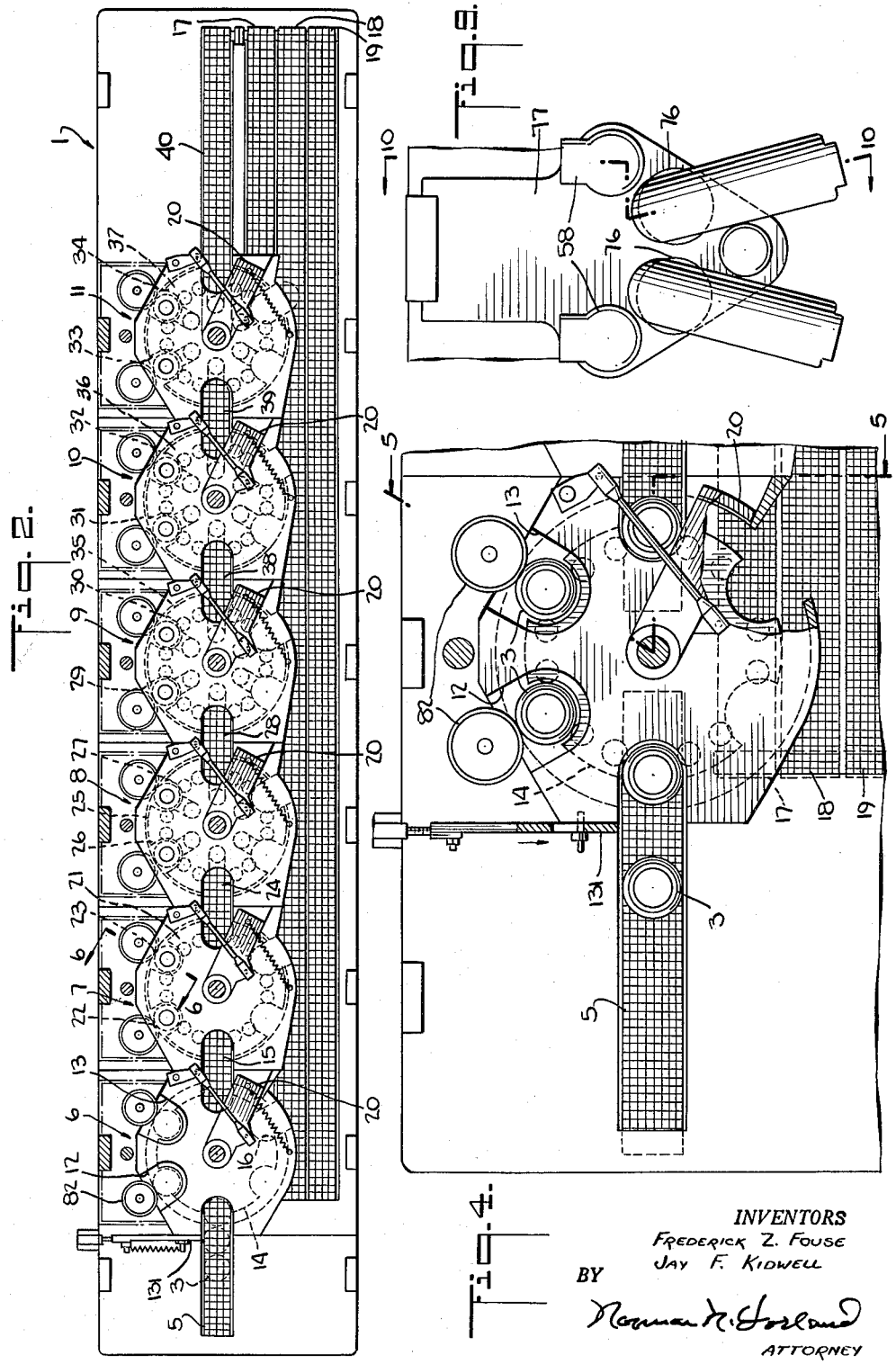
FIG. 2 is a top plan view of the machine of FIG. 1.
Figures 3, 6:
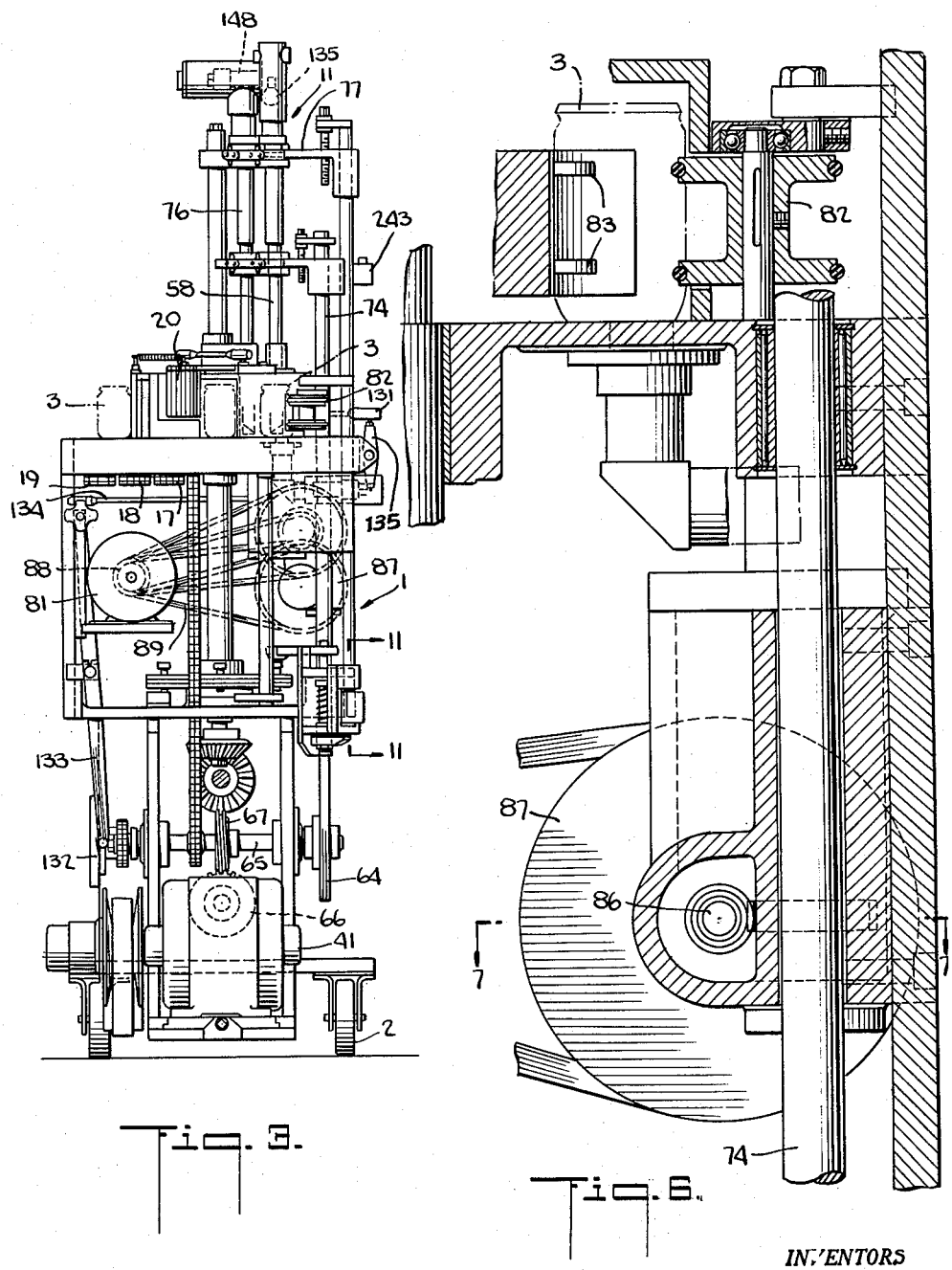
FIG. 3 is an end elevational view of the machine of FIG. 1.
FIG. 6 is a sectional view of the bottom inspection station taken along line 6—6 of FIG. 2.

The container inspection machine will first be described generally with particular reference to FIGS. 1–3. The inspection machine comprises a table 1 preferably mounted upon casters 2 so that the machine may be positioned as desired wherever the automatic inspection operation may be best performed. The containers to be inspected such as the glass jars 3 are fed continuously onto the left end of the table top 4 by conveyor belt 5.

A line of jars 3 are fed by the conveyor 5 to the inspection system which includes six separate inspection stations 6–11 positioned in line along the top 4 of the table 1. As will be more fully described below, each of these inspection stations inspects each of the jars 3 for a separate objectionable fault. Thus, the first inspection station 6 has an optical inspection system adapted to detect dips or other low areas on the rims of the jars 3. A stepped pocket wheel 14 moves successively to each of a pair of separate scanning positions 12 and 13 for the rim dip inspection. If no dip is detected at the rims of the jars 3, the jars 3 are passed from the pocket wheel 14 to a transfer conveyor 15 which moves the jars 3 to the bottom inspection station 7. If a dip is detected in the rim of a jar 3, a reject system closes gate 20 which prevents the removal of the jars 3 by the conveyor 15 and causes the pocket wheel 14 to carry the jar 3 to a reject position 16. At the reject position 16 the reject belts 17, 18, and 19 carry the defective jar 3 from the pocket wheel 14 to a suitable reject chute (not shown).

At the bottom inspection station 7, the pocket wheel 21 carries the jars 3 successively to each of two bottom scanning positions 22 and 23. At these bottom scanning positions 22 and 23 an optical inspection is made of the bottom of each of the jars 3. Detection of a fault in the jar bottom causes the defective jars 3 to be diverted by gate 20 to the reject conveyors 17–19. If no fault is detected the jars 3 are transferred by transfer conveyor 24 to the finish inspection station 8.

The pocket wheel 25 of the finish inspection station 8 carries each of the jars 3 successively to finish scanning positions 26 and 27 where the jar finishes are scanned by an optical system which detects checks, cracks or other faults. Defective jars are blocked from the transfer conveyor 28 by reject gate 20 and they pass to the reject conveyors 17–19. Jars 3 having no faults in their finish are transferred by transfer conveyor 28 to body station 9 which is the first of three generally similar body inspection stations. These three body inspection stations each have a pair of scanning positions 29–34, respectively, which as will be more fully explained below inspect the jars 3 side walls or body portions for different objectionable faults such as stones, blisters, washboards, laps and vertical marks or lines. The three pocket wheels 35, 36 and 37 at these points are connected by transfer conveyors 38 and 39. The jars 3 having no defects pass from the final body inspection station 11 on the exit conveyor 40 and defective jars 3 rejected by any of the three body inspection stations 9, 10 or 11 pass onto the reject conveyors 17–19.

The Mechanical Drive and Synchronizing System

In order to synchronize the movement of the rotating pocket wheels 14, 21, 25, and 35–37 with the movement of the optical system light tubes at each of the inspection stations 6–11 and with the operation of the container rejection gates 20, a unitary drive system is provided for these elements. This drive system is powered by drive motor 41 which continuously rotates the longitudinal drive shaft 42 in the bottom of the table 1 through the intermediation of pulleys 43 and 44, belt 45 and gears 46 and 47.

In order to rotate each of the pocket wheels 14, 21, 25, and 35–37 for the inspection stations 6–11 with a stepped rotation to successively present the jars 3 to the two jar scanning positions at each station, an intermittently rotated drive shaft 48 is mounted longitudinally of the table 1 above the main drive shaft 42. The intermittent rotating shaft 48 is driven from the shaft 42 through the intermediation of a conventional intermittent drive coupling such as a Geneva drive 49 or a Ferguson drive of the well-known type which converts continuous rotary motion to an intermittent turning motion. Each of the intermittent rotated pocket wheels are coupled to the intermittent drive shaft 48 through the intermediation of a vertical mounting shaft 50 (FIGS. 1 and 5). The lower end of the shaft 50 is coupled to the intermittent drive shaft 48 by bevel gears 51 and 52. In the embodiment of the machine illustrated each of the pocket wheels has six jar engaging pockets and the Geneva or Ferguson drive 49 and the bevel gears 51 and 52 are set to rotate each of the pocket wheels through successive steps of 60°. In order to provide for a precise radial adjustment of each of the pocket wheels on its drive shaft, the pocket wheels are connected by a continuously adjustable wedge connection (FIG. 5) including the cylindrical wedge 53 which frictionally connects conical portion 54 of the drive shaft 50 and the pocket wheel hub 55. The body portion 56 of each pocket wheel is releasably coupled to hub 55 by spring loaded detent balls 57 to prevent damage when a jam occurs.

As will be more fully described in connection with a description of the individual inspection stations 6–11, each of the two scanning positions at each inspection station has a vertical light tube 58 which is lowered into the jars 3. These tubes are lowered into the jars 3 in the period between the stepped movement of the pocket wheels by a series of cams 59–64. Each of the cams 59–64 is mounted on a horizontal cam shaft 65 which is continuously rotated by being coupled to the jar rotating drive shaft 42 through the intermediation of spiral gears 66 and 67.

The optical systems for the inspection stations 6–11 which are designated generally by reference numbers 68–73 are reciprocated vertically by being connected to the vertical cam follower rod 74 each of which engages one of the cams 59–64 at a cam roller 75. The coupling 49 is set to provide for rotation of the shaft 48 during a portion only of each complete revolution of the main drive shaft 42. The cams 59–64 are correspondingly set to provide one complete vertical reciprocation movement for the light tubes 58 during the dwell period between each of the movements of the shaft 48 and the connected pocket wheels 12, 21, 25, 35, 36 and 37. Each of the optical systems except the system 69 at the bottom inspection station 7 has a vertical photocell tube 76 connected to the light tube 58 for movement therewith during the scanning operation. The tubes 58 and 76 are mounted on a bracket 77 at the top of the vertical cam follower rod 74. The operation of each of the optical systems for the inspection stations will be described below.

The conveyor belts 5 and 40 which carry the jars 3 into and out of the inspection machine as well as the reject conveyors 17, 18, and 19 are driven from the end cam shaft 65 by suitable coupling which includes pulleys 78 and belts 79 and 80. The short conveyors moving the jars between the inspection stations such as conveyor belts 15, 24, 28, 38, and 39 are driven from belt 40 by a suitable interconnecting drive belt.

At each of the two jar scanning positions for each of the six inspection stations 6–11, the jars 3 are rotated at a relatively high speed such as about 1700 r.p.m. while they are scanned by a beam of light.

Figure 1:
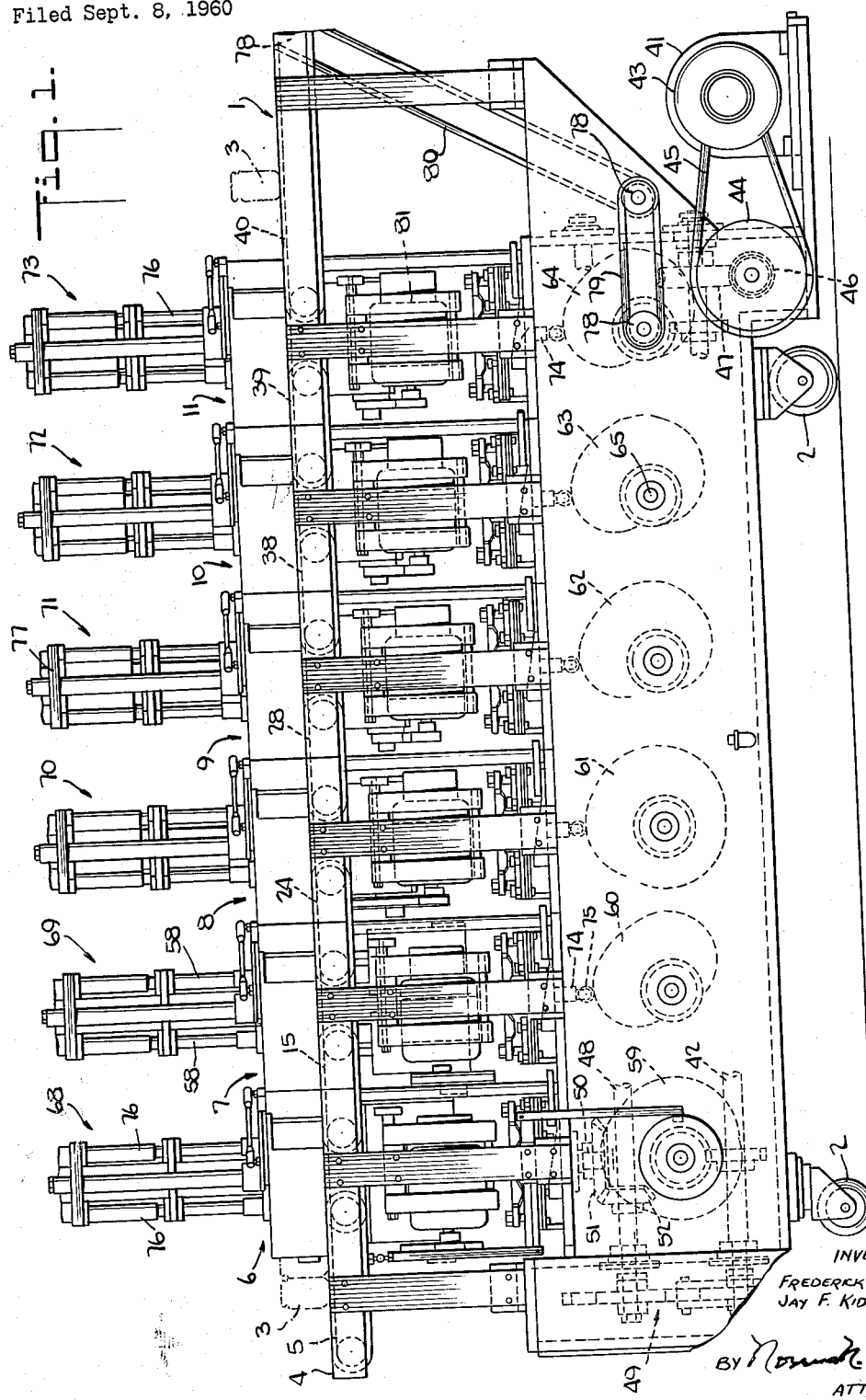
FIG. 1 is a side elevational view of the preferred embodiment of the automatic container inspection machine.

A separate drive motor 81 is preferably provided for each of the inspection stations 6–11 as illustrated in FIG. 1. Drive motors 81 are each coupled to individual jar drive wheels 82 at each of the scanning positions by the coupling means illustrated in FIGS. 6-8. At the scanning positions the jar rotating wheels 82 engage the jars 3 and rotate them in cooperation with the jar support wheels 83 on the sides of the pockets in pocket wheels 14, 21, 25 and 35-37.

The preferred embodiment of the coupling between the drive motors 81 and the jar drive wheels 82 is illustrated in FIGS. 6, 7, 8, 26 and 27. The drive wheels 82 are mounted on a vertical drive shaft 84 at each scanning position. Each of the two drive shafts 84 for the two jar drive wheels 82 are mounted in a drive box 85 as illustrated in FIG. 8. The drive box 85 has a main horizontal drive shaft 86 which is coupled to the drive motor 81 through the intermediation of pulleys 87 and 88 and coupling belt 89. The drive shaft 86 is coupled to the two vertical shafts 84 at each scanning position to rotate them in opposite directions so that the jars 3 are rotated in opposite directions during the scanning operation. The coupling between the vertical shaft 84 and the horizontal drive shaft 86 includes a worm gear 90 which engages pinion gear 91 at the lower end of idler shaft 92. Idler shaft 92 is coupled to the vertical shaft 84 by pinion gears 93 and 94.

As illustrated in FIGS. 7 and 8, each of the drive shafts 84 is pivotally mounted on the idler shaft 92 by means of the spaced brackets 95. The interconnected and rotating gears 93 and 94 tend to turn the right-hand shaft 84 of FIG. 7 in a clockwise direction and the left-hand shaft 84 in a counterclockwise direction. It will be seen that this movement of the shafts 84 forces them against the jars 3 in the scanning positions and causes the rotating drive wheels 82 to spin the jars 3 in opposite directions. At the same time the pivotal mounting of the shaft 84 permits the drive wheels 82 to automatically adjust or accommodate themselves to the particular diameter of the jars 3 being scanned and provides a positive drive for the jars 3 having slightly differing sizes or non-circular cross-sections.

In order to facilitate the entry and exit of the jars 3 from each of the scanning positions it is preferred that the rotation of the drive wheels 82 and the jars 3 be limited to the scanning period. For this reason an automatic braking means is provided at the drive pulley 88 for each of the drive motors 81. The automatic braking means is illustrated in FIGS. 26 and 27.

As illustrated in FIG. 26, the continuously rotating shaft 96 of each drive motor 81 is coupled to a rotatable clutch plate 97 having a friction disc 98 mounted thereon. Drive pulley 88 is rotatably mounted on the shaft 96' on the bearings 99 by a rotatable collar 100. In normal operation the drive pulley 88 and its attached collar 100 are held against the rotating friction surface 98 of clutch plate 97 by the compressed spring 101. This causes the drive pulley 88 to rotate with motor shaft 96 at the speed of the drive motor 81. When it is desired to stop the rotation of the jars 3 by braking the jar drive wheel 82, compressed air is admitted through port 102 behind piston 103. Piston 103 moves the mounting collar 100 and the attached drive pulley 88 to the right so that braking flange 104 on the collar 100 engages a stationary friction braking surface 105. This simultaneously removes the motor drive from the drive pulley 88 and applies a braking action to its rotation thereby stopping the drive wheel 82 and the rotating jars 3. The compressed air control system for the braking piston 103 is illustrated in FIG. 27. This system includes a compressed air source 106 which is connected to the braking means through the intermediation of conduit 107, control valve 108, and conduits 109, 110 and 111. The control valve 108 is intermittently opened to admit compressed air to each of the braking pistons 103 to stop the jar rotation at the termination of each scanning operation by rotatable cam 112 which is conveniently driven in synchronism with the optional scanning system by being coupled to the conveyor machine drive system through the intermediation of pulley 114 and belt 115.

Also illustrated in FIGS. 27 and 28 is a braking means for the intermittently rotated pocket wheel rotating shaft 48 to lock this drive shaft 48 at the termination of each movement. This brake comprises an air operated piston 116 (FIG. 28) which presses a brake shoe 117 against braking disk 118 on shaft 48 at the termination of the stepped movement. The compressed air is admitted to piston 116 through conduit 119 from control valve 113 which may conveniently be controlled by rotating cam 112.

An alternate embodiment of the jar rotating drive means for use on the container finish and body scanning stations is illustrated in FIGS. 13-15. In this embodiment the drive wheel 82 is replaced by a turntable 120 rotatably mounted in suitable bearings 121 in a drive box 122. A friction coated upper surface 123 of the turntable 120 is positioned at the jar scanning positions to receive and rotate each of the jars 3. Each of the turntables 120 is coupled to one of the drive motors 81 through the intermediation of pulley 124, horizontal drive shaft 125 and intercoupled worm and pinion gears 126 and 127, respectively. The two turntables 120 at each scanning station are preferably rotated in opposite directions.

In order to retain each of the jars 3 on the rotating turntables 120, a vacuum hold-down system is provided which includes several small conduits 128 on the top of each turntable 120 which communicate with a source of vacuum through the hollow center 129 of the turntable 120 and inlet coupling 130.

*Jar Rim Dip Inspection Station*

As described above, the first jar inspection station 6 is a jar finish dip inspection which inspects the tops of each of the jar rims to detect objectable low spots or dips in the container rims which would prevent a satisfactory seal. At each of the two scanning positions 12 and 13 at the dip inspection station 6 the jars 3 are inspected by the optical system illustrated in FIG. 17 while being rotated in opposite directions by the jar drive wheels 82.

In order to provide a smooth feeding of the jars 3 into the first pocket wheel 14, a gate 131 is provided which intermittently slides open to admit one jar to a pocket presented at the end of conveyor 5. The gate 131 is reciprocated by a coupling with main drive shaft 42 through the intermediation of cam 132 (FIG. 3), cam follower rod 133 and connecting arms 134 and 135.

After a jar has been moved into each of the scanning positions 12 and 13 by the pocket wheel 14, the optical system 68 lowers parallel light tube 58 and photocell tube 76 downwardly into scanning position through the intermediation of the vertically reciprocating cam follower rod 74 and cam 59. Light tube 58 has a light source on its upper end similar to that illustrated in FIG. 10 including lamp 153, beam framing aperture 136, and a condensing system 137. The frame 136 and the condensing system 137 form a narrow scanning beam 138. The beam 138 is reflected by inclined mirror 139 as a horizontal beam 140. Horizontal beam 140 passes through a narrow aperture 141 which passes a narrow beam having a vertical dimension of about .02 inch. The beam 140 is directed so that it strikes a contact line between a cylindrical mask 142 and the top surface 142' of the jar rim. The mask 142 is rotatably mounted on bearings 143 on light tube 58 so that it rotates with the jar 3. When the rim is level without dips or other flaws the light beam 140 is reflected and absorbed by the jar rim so that insufficient light passes on toward the photocell tube 76 to have any effect. When there is a dip in the container rim, the light beam 140 passes between the lower surface of the mask 142 and the container rim and through the photocell tube aperture 144 where it strikes the tilted mirror 145 and is reflected as vertical light beam 146 through a suitable focusing lens 147 to a photoelectric tube 148 as illustrated in FIG. 10.

The light beam 146 activates the photoelectric tube 148 causing an output signal pulse which is fed to the amplifier 149 (FIG. 16) and is thereafter applied to the solenoid 150 of a container reject relay 151.

The operation of the container rejection system as controlled by the container reject relay 151 will now be described with particular reference to FIG. 12. A similar rejection system is used at each of the jar inspection stations 6–11.

As illustrated in FIG. 12, each of the jars 3 is carried from the scanning positions 12 and 13 to an exit position 154 adjacent transfer conveyor belt 15. If no fault has been detected in the jar 3 at either of the scanning positions 12 and 13, a pivotally mounted gate member 20 will remain in its normal open position as illustrated in FIG. 12 so that the moving conveyor 15 carries the jars 3 from the pocket wheel 14 to the pocket wheel of the next inspection station.

If a dip in the container rim has been detected by the above described optical system at either of the two scanning positions 12 and 13, the gate 20 is swung across the conveyor 15 and the faulty jar 3 is carried beyond the transfer conveyor 15 and is passed to the reject conveyors 17, 18 and 19 by the following jar reject system.

As illustrated in FIG. 12 the reject system includes a reject wheel 156 coupled to the pocket wheel drive shaft 50 so that it rotates in synchronization with the pocket wheel 14. Six vertically movable reject pins 157 are mounted around the circumference of the wheel 156 with one pin 157 corresponding to each of the pockets in the pocket wheel 14. The pins 157 remain in their normal raised position in the absence of a fault in a jar. When a fault is detected at either of the scanning positions 12 or 13 of the arm 152 of the reject solenoid coupled to that scanning position moves downwardly against the pin 157 corresponding to the pocket at that scanning position and lowers the pin 157 to its reject position as illustrated by pin 158. When the pocket containing the defective jar 3 and the corresponding lowered reject pin reach the exit position 154 adjacent the transfer conveyor 15, passage of the jar 3 to the conveyor 15 is prevented by the gate 20 which is swung across the pocket opening and the conveyor 15. The gate 20 is swung across the conveyor 15 by the lowered reject pin striking the crank 159 causing the gate 20 to swing counterclockwise through the intermediation of shaft 160, crank arm 161, and connecting rod 162. The next stepped movement of the pocket wheel 14 carries the defective jar 3 onto one or more of the reject conveyors 17, 18 and 19 and these conveyors carry the defective jar 3 out of the pocket to a rejection chute. Pin raising cam 163 simultaneously returns the lowered reject pin 158 to its normal raised position for the next scanning cycle.

Jar Bottom Inspection Station

Jars having no defects causing their rejection by the jar rim dip inspection station 6 are transferred by conveyor 15 to the bottom inspection station 7. The pocket wheel 21 of the bottom inspection station 7 transports the jars 3 successively to the two bottom scanning positions 22 and 23. When the jars 3 have been moved into the scanning positions 22 and 23 the optical system 69 lowers a light tube 58 into each of the two jars 3. The bottom inspection station is illustrated in FIG. 18 which shows one of the light tubes 58 in its lowered position adjacent the bottom of a jar 3 which is being rotated by container drive wheel 82. The lower portion of the light tube 58 has a light aperture 166 having an inclined and mirrored surface 167 which reflects the vertical light beam 168 against the bottom of the jars at an angle to the jar bottoms as beam 169. When the beam 169 strikes a crack in the jar bottom such as crack 170, the beam 169 is reflected downwardly along path 171 through a focusing lens 172 against a mirror surface 173. The mirror 173 reflects the light beam from the crack 170 to a phototube 174.

The phototube 174 is connected to an amplifier 149 which operates a rejection system similar to that described above for the container rim dip inspection station.

When there are no cracks or other defects in the jar bottom, the light beam 169 strikes the top plate 165 so that it fails to pass through the aperture 175 and into the optical system for the phototube 174. The two light tubes 58 at the successive bottom scanning positions preferably face in opposite directions so that the beams from the slots 166 in the bottom of tubes 58 pass through the jar bottoms along different lines. Cracks which may be generally parallel to one scanning beam and thus escape detection are picked up by the second beam.

In order to keep the mirror 173 clean and to remove any foreign matter including broken glass from its surface, the mirror 173 is preferably rotatably mounted in the tube 176. This permits the mirror 173 to be rotated 90° on rod 177 to drop the glass or other foreign matter through the aperture 178.

Jar Finish Inspection Station

The jar finish inspection station inspects the upper portion of the jars 3 including the outer rim 179 (FIG. 19) which engages a closure in the sealing of the jars. Occasionally in the manufacture and the handling of glass jars, cracks or checks occur at the rim or shoulders of the jars 3 and it is necessary to detect and reject jars having such cracks or checks. The jar finish inspection station has two jar finish scanning positions 26 and 27 adapted to direct scanning light beams through the jar finish in different directions so that one beam or the other will detect a finish crack or check no matter what angle it has with respect to the jar radius. Each of the jar finish scanning positions has a light tube 58 and a photocell tube 76. The light tube 58 is lowered by the above described optical system 70 so that a beam of light 183 is directed by mirror 185 as beam 184 through the entire jar finish from the rim of the jar downwardly through and including the jar shoulder. The horizontal beam 184 is redirected as beam 187 by a second generally vertical mirror 186 (FIG. 20) so that it strikes the jar finish at an acute angle with the jar radius. If the beam 187 strikes a crack or check 188 it will be reflected as a beam 189 against the inclined mirror 190 of the photocell tube 76 and the mirror 190 directs the reflected light beam vertically as beam 191 to a photocell 148. The photocell 148 is coupled to a reject system similar to that described above for the preceding inspection stations 6 and 7 which passes defective jars to reject conveyors 17–19. As shown in FIG. 20 the horizontal beams 187 are directed towards the jar 3 finish along oppositely directed paths so that they have different angles with respect to the jar radius whereby checks generally parallel to one of the beams 187 at one scanning station will be presented at an angle at the other scanning station to provide a reflected beam 189 to activate the rejection system.

Jar Body Inspection Stations

Jars 3 which pass through the first three inspection stations 6–8 without being rejected for faults are presented by the transfer conveyor 28 to the body inspection stations 9, 10 and 11. Each of these three body inspection stations is particularly sensitive to a given type of fault in the jar body and to reject and record the rejection of a jar having such a fault. Each of the three inspection stations has a pocket wheel which successively presents the jars 3 to a pair of body scanning positions and at each of these positions a scanning light tube 58 and a related photocell tube 76 are lowered into scanning position by a mechanical support as described above and similar to those for inspection stations 6, 7, and 8.

The scanning light beam at each of the scanning positions and the optical elements in the lower portions of the light photocell tubes at each station are arranged to be sensitive to a particular fault as will be more fully described below. Detection of a fault by these optical systems at any scanning position causes the generation of a signal pulse in the photocell 148 for each position and the operation of a reject mechanism similar to that described for the jar rim dip inspection station to pass defective jars 3 to the reject belts 17, 18 and 19.

The first body inspection station 9 is adapted to detect a defect in the jars 3 known as a washboard.

A washboard is an area on the outside of the jar comprising several closely spaced circumferential wrinkles. Such washboards scatter a beam of light passing outwardly through the jar wall in refracted light beams flaring outwardly from the jar side walls as illustrated at 199 and 200 in FIG. 21. The light tube 58 lowered into each jar 3 at a washboard scanning position redirects vertical light beam 192 by mirror 193 through a rectangular aperture 194 in the side wall of tube 58 as a horizontal scanning beam 195. When there are no washboards on the jar 3 side walls beam 195 strikes a solid portion 196 in the photocell tube 76 (FIG. 22). When, however, the beam 195 encounters a washboard 198 the beam 195 is refracted upwardly and downwardly as beams 199 and 200 and these beams pass through apertures 197 and are redirected by the mirror 201 upwardly to a photocell 148 which activates the reject system similar to those described for the other inspection stations to transfer the defective jar to the rejection belts 17–19.

The second body inspection station inspects each of the jars 3 for vertical marks or lines which are elongated vertically directed defects on the outer surface of the jars. A light beam from the center of the jars 3 passing through a vertical mark is refracted to two beams flaring outwardly in a horizontal plane. A light tube 58 for each of the two jar scanning positions at the vertical mark inspection station 10 directs a light beam 203 (FIG. 23) of narrow cross-section against the side walls of the jars 3. The beam 203 normally strikes the mask portion 204 of the related photocell tube 76, however, if the jar 3 has a vertical mark 206 the beam 203 is refracted along two flaring paths through horizontally spaced apertures 209 and the inclined mirror 208 redirects these light beams 209 to a photocell 148 which activates the jar reject system as previously described for the other stations.

The final body inspection station is used to detect stones or blisters in the jar side walls.

A stone is a small bit of opaque material, generally gray or white unfused silica bedded in the glass, generally near the surface. The glass immediately around the stone is generally lenticular.

A blister is an air bubble in the glass which may either be closed and completely surrounded by glass or open with one side communicating with the atmosphere either within or without jar.

The optical system used to detect stones and blisters is illustrated in FIGS. 10 and 25.

At each of the two scanning positions on pocket wheel 37 for stones and blisters, a light tube 58 is lowered into the rotating jars 3 by the cam 64 and cam follower rod 74 and the parallel and related photocell tube 76 is lowered in synchronization therewith adjacent the outer wall of the rotating jar 3. The rectangular beam 210 is reflected by the angled mirror 211 through a rectangular aperture 212 in tube 58 and through the side wall of the jar 3. Beam 210 normally strikes a masking portion 213 on the wall of the phototube 76 (FIG. 25). When, however, a stone or blister is encountered in the wall of the jar 3, portions of the horizontal light beam 214 are refracted slightly along upwardly or downwardly diverging paths as illustrated at 215 (FIG. 10). This refracted light 215 passes through either or both of the apertures 216 and 217 in the wall of the phototube 76 and the refracted portions are redirected towards the photocell 148 by tilted mirror 218. Stones and blisters which are thus detected normally pass through the previous inspection stations such as the washboard and lap inspection stations since sufficient light is not normally refracted through the opening in the photocell walls at these positions to operate the related reject jar amplifier. The amplifiers used at the two scanning positions 33 and 34 for the stone and blister inspection station 11 are set to operate the reject relay 151 at the signal level generated by the refracted beam or beams 215. Jars 3 in which a stone or blister is detected are transferred to the reject conveyors 17–19 by a reject system including a gate 20 as described above. Jars 3 on which no fault is detected at any of the inspection stations 6–11 pass from the inspection machine on the exit conveyor 40.

Rejection Control Amplifier

A preferred embodiment of the rejection control amplifier 149 is illustrated in FIG. 16. The output fault signal from each of the twelve photocells 148 or 174 which preferably are of the photomultiplier type is coupled by coupling condensor 221 and adjustable gain control resistor 222 to the grid 223 of the triode amplifier section 224 of a dual triode tube 25 preferably of type 5692. The inverted and amplified signal from plate 226 of triode 224 is coupled to a clipper amplifier triode section 227 of tube 225 by the negatively and adjustably biased grid 228. The adjustable negative bias for clipper control 227 is used to adjust the grid 228 sufficiently below cut off so that only the signal pulses from the fault in the jar are amplified and so that signal noise resulting from jar irregularities is eliminated. The gain control 222 in conjunction with the clipper grid bias control are used to determine whether the fault is severe enough to be rejected. The output of clipper amplifier 227 is coupled to a one-shot multivibrator stage using a dual triode 229. The triode section 230 of the tube 229 is normally held cut off by the negative voltage applied to its grid 231 through the adjustable bias resistor 232. Triode section 233 of the multi-vibrator tube 229 is normally conducting and a fault signal from the clipper amplifier 227 cuts off triode 233 causing the plate voltage of triode 233 to rise so that triode section 230 conducts. The plate voltage 230 now drops and is coupled through condensor 234 to the grid of triode section 233 holding it at cut off. Triode 233 will remain cut off for a period controlled by the time constant of condensor 234 and resistors 235 and 236. The plate 237 of triode section 233 is coupled to a negative voltage through voltage divider 238, 239. This negative voltage holds the grid 240 below cut off.

When the multi-vibrator 229 is triggered by a jar fault the rise in the voltage on plate 237 of triode 233 causes tube 241 to conduct. This causes current to flow through the solenoid 150 of reject relay 151 to operate the above described rejection system and also to operate fault counter 242. The time constant controls 234–236 and the multivibrator control 232 are set to keep the relay 151 closed until each jar is entirely scanned so that only one rejection action is provided and one count made for each jar.

In the bottom and body inspection stations the downward passage of the scanning tubes past the jar finishes gives a large signal. To prevent such undesired signals proximity switches 243 (FIG. 3) are positioned to be closed when the scanning tubes reach their scanning positions. The contact 244 (FIG. 16) of the proximity switch is placed in the clipper amplifier cathode to activate the amplifier only when the scanning tubes 58 and 76 reach their scanning positions.

Operation

The operation of the inspection machine which has been referred to above in connection with detailed descriptions of the various portions of the machine will now be summarized.

The jars 3 are continuously fed into the machine 1 on the conveyor belt 5. A reciprocating gate 131 intermittently passes a jar 3 to an empty pocket in the stepped pocket wheel 14 of the jar rim dip inspection station 6.

Intermittent rotation of the pocket wheel 14 carries each jar 3 successively to generally similar rim dip inspection positions 12 and 13. At the first inspection position 12 the jar 3 is rotated in one direction by the jar rotating wheel 82 while its rim is optically scanned to determine the presence of objectionable dips. At the second inspection station a second inspection is made of the same jar 3 by rotating it in the opposite direction and with the light scanning beam directed in an opposite direction to detect any rim dips missed at the first inspection position 12.

The presence of a dip in the jar rim permits the scanning light beam to pass over the rim and to activate a photocell 148 (FIG. 10). The signal generated in the photocell 148 is fed to amplifier 149 to activate the jar reject system illustrated in FIG. 12. The jar reject system for the rim dip inspection station 6 and each of the five subsequent inspection stations are similar. The reject solenoid 150 which is activated by the generation of a fault signal such as the rim dip signal or the other fault signals operates a reject relay 151 and an interconnected reject arm 152. As more fully described above the arm 152 lowers a reject pin 157 which corresponds to the pocket in the rotating pocket wheel containing the defective jar. The lowering of a reject pin 157 by the arm 152 closes a reject gate 20. The gate 20 prevents defective jars 3 from being transferred from the pocket wheel of the inspection stations to the jar transfer conveyors which normally carries the jars to the succeeding inspection stations and causes the defective jars 3 to be passed on to a reject position where they are transferred to reject conveyors 17–19.

Jars 3 which pass the rim dip inspection are transferred to conveyor 15 which carries them to an empty pocket in the stepped pocket wheel 21 of a jar bottom inspection station 7. At this station each of the jars 3 is passed successively to bottom scanning positions 22 and 23. At these positions as shown in FIG. 18 a beam of light 169 is passed through the rotating bottoms of each of the jars 3. A fault 170 in the bottom of the jars 3 reflects the beam 169 as a redirected beam 171 through a suitable optical system to a photocell 174. A fault signal is generated in photocell 174 which initiates a reject operation through a mechanism similar to that described above whereby the gate 20 at the bottom inspection station 7 is closed to prevent the forward transfer of the defective jars 3 to the rim inspection station 8 and thus causes the transfer of the defective jars 3 onto the reject conveyors 17, 18 and 19.

Jars 3 which pass both the rim dip inspection and the bottom inspection are transferred onto conveyor belt 24 to a finish inspection station 8 where the jars 3 are rotated in opposite directions at successive rim inspection scanning positions 26 and 27. At these stations a scanning beam 184 is directed through the container finish as illustrated in FIGS. 19 and 20. The presence of a crack or other fault in the jar finish reflects the scanning beam 184 into suitably positioned photocells 143. These photocells operate in the above described manner to close the reject gate 20 at the finish inspection station 8 so that the defective jars 3 are passed onto the reject belts 17–19.

Jars 3 which pass the finish inspection station are now passed on conveyor belt 28 to a body inspection system comprising three inspection stations 9, 10, and 11. At each of these stations the jars 3 are rotated in opposite directions at two scanning stations and the optical systems are arranged at the three stations 9, 10 and 11 to detect washboards, vertical marks, and blisters and stones, respectively. When a defective jar 3 is detected at any of the three stations the reject gate 20 is closed at this station to prevent the forward transfer of the defective jars 3 and to cause them to be passed to the reject belts 17–19. Thus, the detection of a fault in a jar at any inspection station in the machine results in the immediate removal of that jar from the inspection station of the inspection machine and prevents the forwarding of a defective jar through the machine where such a jar is liable to shatter or chip and thereby interrupt and slow down the machine operation.

Jars 3 in which no fault is detected at any of the inspection stations are passed out on exit conveyor 40.

It will be seen that the present invention provides an improved fully automatic high speed container inspection machine adapted for the continuous automatic inspection of transparent containers such as glass jars. The machine is adapted to inspect all critical areas or surfaces of the containers including the rims, finishes, shoulders, body portions, and bottoms. Inspection for objectionable faults in these various portions of the jars are made at a series of separate stations and jars in which a fault is detected are immediately removed from the inspection machine so that they are not passed through the remaining inspection stations. The optical systems at the various inspection stations are independent of one another permitting independent adjustment to be made on them. The provision of these independent optical scanning positions also permits the machine to be adapted to a wide variety of inspections and also permits the inspections to be changed from time to time as is necessary to detect the particular type of objectionable fault which may render a particular transparent container useless or objectionable.

The inspection machine of the present invention is also reliable and compact and may be conveniently used directly in a jar manufacturing or jar sealing line to handle the manufacture of the jars to be sealed at the same high speed used in the remainder of the line.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An inspection machine for glass containers comprising means to rotate a container, a rotatably mounted opaque mask adapted for engagement with the container rim, means to direct a beam of light at the contact area between said mask and the container rim, a light sensitive means on the opposite side of said rim from said light directing means adapted to generate a fault signal when a low area in the container rim permits the passage of light between the rim and said mask.

2. An automatic inspection machine for transparent containers comprising the combination of a plurality of rotatable pocket wheels, a container inspection station at each of said wheels, wheel drive means to move each of said wheels in stepped rotation to present containers successively to the inspection stations, container rotating means at each of said inspection stations, first article conveyor means connecting said wheels to transfer articles successively from one to the other, second article conveyor means adjacent said first conveyor means for accepting rejected articles from each of said inspection stations, container defect sensing and reject means at each of said inspection stations for detecting and directing the defective articles at each inspection station to said second conveyor means, brake means connected to each of said container rotating means, and means to apply said brake to said rotating means at the end of the container inspection at each station.

3. The machine as claimed in claim 2 which further comprises a brake means coupled to said wheel drive means, and means to apply said brake to said wheel drive means after each stepped movement of the wheels.

4. An inspection machine for transparent containers comprising means to successively rotate a container in opposite directions, light means positioned to scan the container bottom as it rotates in both directions, means to receive a portion of the light beam from said means diverted by a container bottom defect, and container reject means coupled to said receiving means.

5. An automatic inspection machine for transparent containers comprising the combination of a plurality of pocket inspection wheels, a container scanning position at each of said wheels, conveyor means to move the containers between said wheels, intermittent drive means to step said wheels to successively present containers to said scanning positions, container scanning and flaw sensing means at each scanning position, container rejection means coupled to said flaw sensing means for rejecting a container from each of said wheels when a flaw is sensed therein, and said flaw sensing means comprising a light transmission tube movably mounted for intermittent downward movement into the containers, reciprocable drive means operatively coupled to said tube, a light source in said tube, a photocell, and optical means within said tube positioned to direct a light beam from said light source to said photocell along a path including a light directing flaw in the container.

6. An automatic inspection machine for transparent containers comprising the combination of a plurality of pocket inspection wheels, a container scanning position at each of said wheels, conveyor means to move the containers between said wheels, intermittent drive means to step said wheels to successively present containers to said scanning positions, container scanning and flaw sensing means at each scanning position, container rejection means coupled to said flaw sensing means for rejecting a container from each of said wheels when a flaw is sensed therein, and said scanning positions comprising a rotatable turntable, drive means to rotate said turntable and means to form a vacuum at the top of said turntable to hold a rotating container thereon.

7. An automatic inspection machine for transparent containers comprising the combination of a plurality of pocket inspection wheels, a container scanning position at each of said wheels, conveyor means to move the containers between said wheels, intermittent drive means to step said wheels to successively present containers to said scanning positions, container scanning and flaw sensing means at each scanning position, container rejection means coupled to said flaw sensing means for rejecting a container from each of said wheels when a flaw is sensed therein, and said scanning positions comprising a drive wheel rotatably mounted and positioned to frictionally engage and rotate a container, drive means for said drive wheel including a brake for stopping the rotation of said drive wheel and the container.

8. The machine as claimed in claim 7 which further comprises a pivotal mounting for said drive wheel adapted to provide swinging motion toward a container in said scanning position, and means to resiliently urge said drive wheel toward the container.

9. An inspection machine for glass containers comprising two spaced container inspection stations, means to transfer containers between said stations, means to direct a narrow light beam through the container walls at each station, means at one station to receive and sense a light beam diverted along a first path by defects in the container walls, means at the other station to receive and sense a light beam diverted by other defects in the container walls, container reject means operatively connected to each of said defect sensing means, and each of said container inspection stations comprising a pair of container inspection positions, a container drive means at each position for rotating the pair of containers at each inspection station in opposite directions.

10. The machine as claimed in claim 9 which further comprises brake means for terminating the rotation of each container prior to the transfer of containers between said positions and said stations.

11. An inspection machine for detecting flaws in the finish and body portions of transparent containers comprising the combination of a finish inspection station having two inspection positions, a body inspection station, means for moving the containers consecutively through said positions and through said body inspection station, means at one of said inspection positions to rotate the containers in one direction and means at the other of said inspection positions to rotate the containers in the opposite direction, means to rotate the containers in the body inspection station, a light beam at each of said inspection positions and said body inspection station directed through the containers thereat, a light responsive means at each of said inspection positions and at said body inspection station positioned to receive light directed thereto by flaws in the containers, means to record the detection of a flaw by each of said light responsive means, and means to reject containers for which a flaw has been recorded.

12. The inspection machine as claimed in claim 11 in which each of said positions of said finish inspection station comprises a first reflecting means positioned to reflect said light beam at that position toward the container finish and a second reflecting means positioned to thereafter reflect said light beam at about a right angle and at a point adjacent the container rim so that it passes through the container finish.

13. The inspection machine as claimed in claim 12 in which the portion of said light beam reflected through the container finish by the second reflecting means at one inspection position is directed through the container finish along a different path from the portion of the light beam previously reflected through the container finish at the other inspection position.

14. The inspection machine as claimed in claim 11 which further comprises an amplifier coupled to each of said light responsive means and including a relay means adapted to activate the container reject means, and a relay holding time delay circuit coupled to said relay whereby the operation of said relay by said amplifier exceeds the duration of a normal fault signal fed to said amplifier by said light responsive means.

15. An inspection machine for glass containers comprising spaced container inspection stations, means to transfer containers from one station to another, means at certain of said stations to pass a light beam through the container walls, means to rotate the containers at said certain stations, defect sensing means, means at said certain stations to receive light from said light beam diverted by defects in the container walls and to direct it to said sensing means, means to move said receiving and directing means and said beam passing means vertically of the container in synchronism, and means operatively connected to said defect sensing means to reject containers found to be defective.

16. An inspection machine for glass containers comprising spaced container inspection stations, means to transfer containers from one station to another, means adjacent the container walls at certain of said stations to pass a light beam through the container walls, means to rotate the containers at said certain stations, defect sensing means, means at said certain stations adjacent to the container walls to receive light from said light beam diverted by defects in the container walls and to direct it to said sensing means, means to move said receiving and directing means and said beam passing means vertically of the container in synchronism, and means operatively connected to said defect sensing means to reject containers found to be defective.

17. An inspection machine for glass containers comprising spaced container inspection stations, means to transfer containers from one station to another, means at certain of said stations to pass a light beam through the container walls, means to rotate the containers at said certain stations, defect sensing means at said certain stations sensitive to changes in said light beam caused by defects in the container walls, means at said certain stations to receive light from said light beam and to direct it to said sensing means to permit it to sense changes therein caused by defects in the container walls through which the beam passes, means to move said receiving and directing means and said beam passing means vertically of the container in synchronism and means operatively connected to said defect sensing means to reject containers found to be defective.

18. An inspection machine for glass containers comprising a container inspection station, means to transfer containers to said station, means at said station to pass a light beam through the container walls, means to rotate the containers at said station, defect sensing means, means at said station to receive light from said light beam diverted by defects in the container walls and to direct it to said sensing means, means to move said receiving and directing means and said beam passing means vertically of the container in synchronism and means operatively connected to said defect sensing means to reject containers found to be defective.

19. An automatic inspection machine for transparent containers comprising the combination of a plurality of container inspection stations, each aligned in spaced relationship, and each having a rotatably mounted pocket wheel having a plurality of container receiving pockets therein, first container conveyor means connecting said inspection stations to transfer containers successively from one to the other, second container conveyor means adjacment said first conveyor means for accepting rejected containers from each of said inspection stations, article defect sensing means at each of a plurality of said inspection stations for detecting each of a plurality of defects positioned throughout an article, a member at each of said stations movably mounted for motion between a first position for directing articles to said first article conveyor means and a second position for directing articles to said second conveyor means, said defect sensing means at each of said stations operatively coupled to said member to move it to said second position upon the sensing of a defective article, each of said couplings between said member and said sensing means comprising a movable pin, a movable mounting for said pin operatively coupled to the pocket wheel at the station whereby said pin moves in synchronism with a container in said pocket wheel and means to move said pin to a reject position when a defect is sensed by said defect sensing means.

References Cited in the file of this patent

UNITED STATES PATENTS

| | | |
|---|---|---|
| 2,393,631 | Harrison | Jan. 29, 1946 |
| 2,643,767 | Baker | June 30, 1953 |
| 2,791,696 | Schell | May 7, 1957 |
| 2,821,302 | Fowler | Jan. 28, 1958 |
| 2,866,376 | Cook | Dec. 30, 1958 |
| 2,902,151 | Miles | Sept. 1, 1959 |